United States Patent [19]

Ericson et al.

[11] 4,402,721
[45] Sep. 6, 1983

[54] COMPUTER CONTROL FOR GLASSWARE FORMING MACHINE

[75] Inventors: Nathaniel H. Ericson, Windsor; Robert J. Japenga, Weatogue, both of Conn.

[73] Assignee: Emhart Industries, Inc., Farmington, Conn.

[21] Appl. No.: 53,059

[22] Filed: Jun. 28, 1979

Related U.S. Application Data

[63] Continuation of Ser. No. 893,965, Apr. 6, 1978, abandoned, which is a continuation of Ser. No. 761,943, Jan. 24, 1977, abandoned.

[51] Int. Cl.$^3$ ................................................ C03B 9/40
[52] U.S. Cl. ......................................... 65/29; 65/160; 65/163; 65/167; 65/DIG. 13; 364/473; 364/476
[58] Field of Search .................. 65/29, 160, 163, 164, 65/DIG. 13; 364/473, 476

[56] References Cited

U.S. PATENT DOCUMENTS 4,007,028 2/1977 Bublitz et al. ...................... 364/473

OTHER PUBLICATIONS

Electronic Timing of Automatic Glass Blowing Machines: by Kwiatkowski and Resing; IEEE Transactions on Industrial Applications, vol. IA-12, No. 2, pp. 165-171, Mar.-Apr. 1976.

Primary Examiner—Arthur D. Kellogg
Attorney, Agent, or Firm—McCormick, Paulding & Huber

[57] ABSTRACT

An I. S. glassware forming machine is controlled by a minicomputer in which a stored sequence of events is accessibly stored in memory such that the identity and condition of a plurality of solenoid valves is programmed to occur at predetermined times in each cycle of the machine. The feeder provides a once per feeder cycle input to the minicomputer and a function generator produces trigger pulses each millisecond so that a factor Q can be calculated to relate these trigger pulses to fractional portions of the cycle, and hence to the event timings stored in memory. The sequence of events stored in memory comprise a threaded list of elements, each of which has four parts. The first part comprises the fractional part of the cycle at which the particular event is to occur and the last part the address of the next succeeding element. The second part contains information to be interpreted for display on an operator's console, and to permit orderly access to the information contained in the four word element. The third part contains the identity of a particular output, and its desired condition (on/off).

5 Claims, 3 Drawing Figures

COMPUTER CONTROL FOR GLASSWARE FORMING MACHINE

This is a continuation of application Ser. No. 893,965, filed Apr. 6, 1978, which in turn is a continuation of Ser. No. 761,943, filed Jan. 24, 1977, both now abandoned.

BACKGROUND OF THE INVENTION

This invention relates generally to control systems for glassware forming machines, and deals more particularly with a system which incorporates a general purpose digital computer for storing a sequence of events within a machine cycle, and the system is capable of controlling the operation of the machine without the necessity of generating, during each feeder cycle, multiple pulses from the glass feeder which provides gobs to the machine, or from a drive shaft such as that associated with the take away conveyor which carries the glassware articles away from the machine.

Prior art approaches to the electronic control of glassware forming machines are exemplified by U.S. Pat. No. 3,762,907, U.S. Pat. No. 3,877,915, U.S. Pat. No. 3,905,793 and U.S. Pat. No. 3,969,703, and U.K. Pat. No. 1,441,099. In all of these prior art patents the basic premise has been to assume that one must have timing means responsive to a drive shaft or the like to provide an instantaneous indication of the elapsed time in each cycle of operation of the machine. In U.S. Pat. No. 3,762,907, U.S. Pat. No. 3,877,915 and U.S. Pat. No. 3,969,703, and in U.K. Pat. No. 1,441,099 a pulse generator provides 360 or more pulses per machine cycle, and is driven by a drive shaft associated with the molten glass feeder, or the take away conveyor, so that the "timing means" for the glassware machine is continually related to the speed of rotation of a rotating machine member. In U.S. Pat. No. 3,905,793 no pulse generator is used, but means is provided for generating a binary coded decimal signal indicative of the instantaneous position of a shaft, and the said signal is compared, sequentially, to a programmed sequence of events stored in memory for producing the necessary output signals to control the machine events.

All of these prior art systems require that a shaft, or other rotating member, be closely monitored during the machine cycle, and that a real time comparison be made to provide the output signals for the various events (usually an "on" or "off" signal to solenoid valves) in the typical Hartford I. S. type glassware forming machine.

In a typical Hartford I. S. type of glassware forming machine, molten glass gobs are delivered from a feeder, by means of a gob distribution system, in a predetermined sequence to the upwardly open blank molds of the various machine sections. Each section comprises a self-contained unit which includes a blank mold station and a blow mold station. The gob of molten glass is formed into a parison at the blank station, and then transferred to the blow station by a neck ring arm which includes a neck mold. The neck mold not only mates with the blank mold at the blank station but also serves to support the parison during transfer to the blow station.

The blank mold may be of the split or the solid type and is adapted to mate with the neck mold. The neck mold is of the split type, and is annular in shape with a central opening to receive a vertically reciprocable plunger which presses the gob into the blank mold in the "press and blow" process, or which plunger is associated with a thimble to permit the parison to be formed by the "blow and blow" process. This latter process provides for "counter blow" air at the blank station in addition to the "final blow" air at the blow station. The description to follow is not limited to either process.

The glass gobs are formed at a rate dictated by the size and shape of the ware to be produced, and these gobs are fed through a distribution system to the various blank mold cavities. Each blank cavity is upwardly open, and a funnel is usually provided to move in onto the closed blank mold for guiding the gob into such cavity. The gob drops through the funnel into the cavity, and into the neck mold, which is always closed except for a short time at the blow station for release of the parison. In this "delivery mode" of the machine the plunger and the thimble must be raised to define the neck opening of the ware. This initial mode is triggered either upon "start up" of the machine, or of a master section thereof, or in accordance with the gob distributor system.

The next mode of operation of the machine can be characterized as one of "settling" the gob or charge into the neck mold. This is accomplished in the usual "blow and blow" process by bringing a baffle down onto the funnel, and providing air to the baffle for "settling" the charge in the blank mold. If no funnel is used in loading the gob, the baffle may move directly in on top of the blank mold. As so configured the blank station of the machine section is in its "parison settle" mode. After settle blowing has been completed the baffle, and funnel, are returned to their inactive positions, respectively.

The next mode of operation of the machine occupies only a short time, and can be characterized as "parison corkage reheat". The plunger moves downwardly away from the neck of the parison allowing the heat of the glass to stablize in this part of the parison. This short pause softens the glass surface by internal conduction, at least in the area where the plunger tip has caused it to cool during the "delivery" and "settle" modes, and as so configured the machine is in its "corkage reheat" mode.

The next mode of operation of the machine can be characterized as one of "parison forming", and in the "blow and blow" process such forming is carried out by introducing counter blow air to the softened area of the parison. The mechanical machine configuration is only altered from the previous mode in that the baffle is lowered onto the blank mold. This mode will see the gob expanded to fill the upper regions of the blank cavity defined by the blank mold and by the baffle. After allowing time for this preliminary forming the counter blow air is turned off, the baffle is returned to its inactive position, and the split blank mold is ready for opening. As so configured the blank station of the machine is in its "parison forming" or "counter blow" mode.

The next mode involves "reheating" parison and the initial phase is accomplished simply by opening the split blank mold. With the blank mold open the parison is not in contact with any mold parts except the neck mold. This configuration allows the heat stored in the thick walled parison to raise the temperature of its external surfaces, hence the derivation of the term "reheat" mode. This phase can be called "blank side reheat".

Once the blank mold has completely opened, the neck ring arm inverts the neck mold and the parison along with it. This phase of the reheat mode can be characterized, thermodynamically, as "invert reheat". This reheating continues at least until the parison has been transferred to the blow station. As the parison reaches the blow station the third phase of reheat occurs. The blow mold closes around the parison and around a bottom plate, which will be spaced below that end of the parison opposite its neck or open end. The blow mold has an upper portion which supports the parison from just below its finish, allowing the neck mold to be opened prior to revert, or return movement of the neck ring mold. The neck ring mold recloses during return movement so that the blank mold can close around it once the neck mold has returned to the blank station.

The next mode involves final forming of the body of the ware, the finish of the ware having been formed by the neck mold at the blank station and during transfer. The final blow air is delivered to the interior of the parison by a blow head which moves down onto the top of the closed blow mold. After a preset time for final blowing the air is turned off and the blow head returned to its inactive position. The blow mold opens and take-out tongs (open) are swung into the blow station. The tongs close around the newly formed ware and the article is lifted off the bottom plate for delivery to the deadplate portion of a take-away conveyor system.

The above described cycle of operation is representative of the typical I. S. machine, and the various events can be seen to comprise simply the turning on or off certain valves in each machine section. This is achieved by the control of solenoids through the control system to be described. The concept of dividing up the cycle into various modes is described in the prior art U.S. Pat. No. 3,877,915 and U.S. Pat. No. 3,905,793. However, these prior art patents, and the others referred to above, do not provide for programming the time period of the machine cycle itself. Insofar as changes to the speed of the feeder, or take away conveyor drive shaft are encountered in these prior art systems, changes to the frequency of a pulse generator tied thereto will necessarily be encountered.

SUMMARY OF INVENTION

The object of the present invention is to provide a control system for a glassware forming machine, which not only includes a general purpose digital computer with suitable memory, and access thereto for producing control signals to solenoid valves or the like when appropriate, but which system also stores a sequence of events within a machine cycle, and the system is capable of controlling the operation of the machine without the necessity of generating, during each feeder cycle, multiple pulses from the glass feeder which provides gobs to the machine, or from a drive shaft such as that associated with the take away conveyor which carries the glassware articles away from the machine.

The chief aim of the present invention is to provide a control system for a glassware forming machine which system not only utilizes a commercially available minicomputer for taking advantage of its memory and its programming capability, but which system also avoids the necessity for a shaft encoder or pulse generator to time the interrupts required to achieve the inherent sequential control basic to the I. S. type, and other types, of glassware forming machines.

In keeping with this aim of the present invention, a simple sensor, or proximity switch, is provided on the feeder to update the programmed sequence of events once per cycle. The interrupts required to sequence the solenoids in accordance with the stored program are derived from a commercially available function generator tied directly to the processor of the minicomputer.

DETAILED DESCRIPTION

Figure 1:
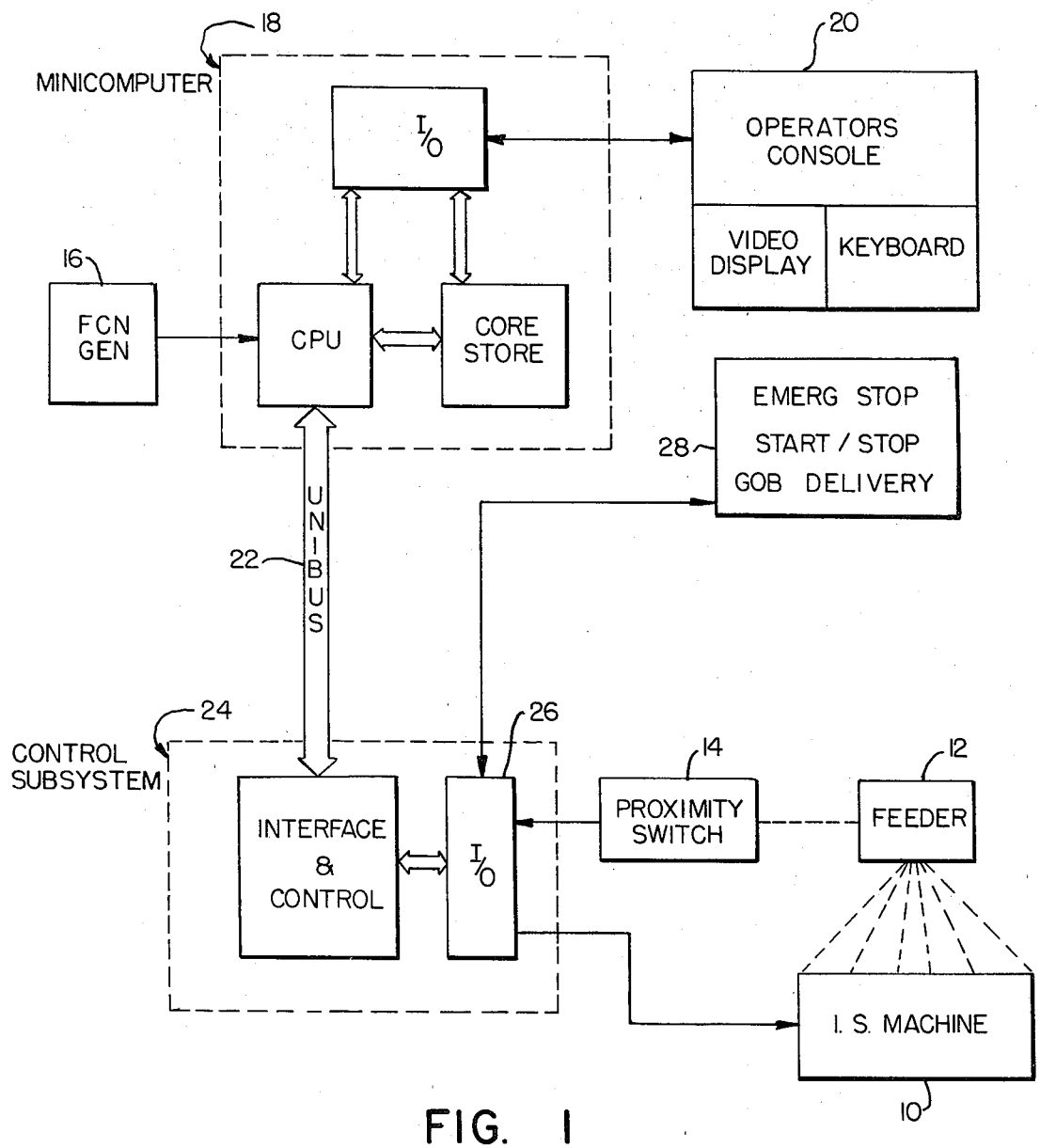
FIG. 1 shows in schematic fashion the essential elements which comprise in combination the control system of the present invention.

Referring now to FIG. 1, the glassware forming machine to be controlled is shown at 10, and comprises a plurality of individual sections arranged in-line, and each section is adapted to produce glassware articles, and to deposit them on a take away conveyor (not shown). The molten glass gobs are delivered to the blank mold side of each section in a predetermined sequence from a feeder 12 which feeds gobs to these sections in a conventional manner. The cycle of the machine 10 (and of its several sections) is dictated by the size and shape of the articles to be produced, and will vary for different production setups. Although the rate at which the molten glass gobs are produced does dictate the cycle time of the I. S. machine, this cycle time need vary only slightly once the machine has been set up for a production run. We have found that such variations may be ignored during a machine cycle, and the system to be described takes advantage of this by sensing only the condition of a proximity switch 14, as a once per feeder cycle pulse produced by some cylically movable part on the feeder. This design concept has facilitated the control of the I. S. machine timing from a commerically available function generator 16 and other digital computer components, to be described, during the machine cycle without reference to any continously monitored shaft position or the like.

Still with reference to FIG. 1, a commercially available minicomputer 18 has conventional processor, memory, and input/output register means linked to one another so that data can be stored for processing by the processor in accordance with program means, which includes means for varying the stored data from a console 20. Preferably, the minicomputer 18 comprises a PDP-11 manufactured by Digital Equipment Corporation of Maynard, Mass. This computer is of the general purpose digital type and has an internal clock (not shown) for timing purposes, and a UNIBUS architecture wherein addresses, data, and control information are sent along the 56 lines of the bus, indicated by the double arrow lines in FIG. 1, The PDP-11 UNIBUS architecture provides for bidirectional and asynchronous communication between the processor, the core memory, and input or output devices as indicated in FIG. 1. In order to permit all of these devices access to the UNIBUS through the addressing system used, a priority structure determines which device gets control of the bus when two request use of the bus simultaneously. The asynchronous feature allows the processor to perform data transfers directly between an input or output device and memory without disturbing the processor registers.

All sequencing is done by a programmed PDP-11 minicomputer using a function generator and an external proximity switch 14 located at the feeder 12 above the I. S. machine 10. The processor measures and records the machine cycle time. This time represents a machine cycle, and a constant Q is calculated to correlate time to a unitary fractional part of that machine cycle. At preset time intervals determined by the function generator, the processor CPU adds the factor Q to the contents of a core store location (cycle counter). This updated core store content is compared to the next element in a threaded or linked list also contained in the core store.

This list is composed of a number of elements. The number of elements is determined by how many valves on the I. S. machine are to be turned on or off, and how many times each valve is to be turned on or off within a cycle. There is one element in the threaded list for each change of state of a valve. Thus, if during one I. S. machine cycle, a valve is turned on twice and off twice, there are four changes of state, requiring four elements. A typical I. S. machine has 21 valves per I. S. machine section, and 8 sections per I. S. machine. There are thus 168 valves. Each valve is typically turned on and off once per machine cycle, with typically one exception, that exception being the valve controlling the baffle mechanism on each section. That valve is typically turned on and off twice during each I. S. machine cycle. Thus, a typical I. S. machine has a threaded list containing 352 elements.

An element is composed of four memory words, and each memory word is 16 bits in length.

Each element is set up as follows:

The first word contains the fractional part, or angle, at which the valve state change is to take place. This angle is between 0° and 359.9° where 360° equals one cycle. The second word contains information for operator display and identification purposes. The third word contains the output number and the state in which it is to be left (on or off). The fourth word contains the memory address of the next element in the threaded list.

The elements in the threaded list are arranged in sequence by angle, that angle being in the first word of each element.

Figure 2:
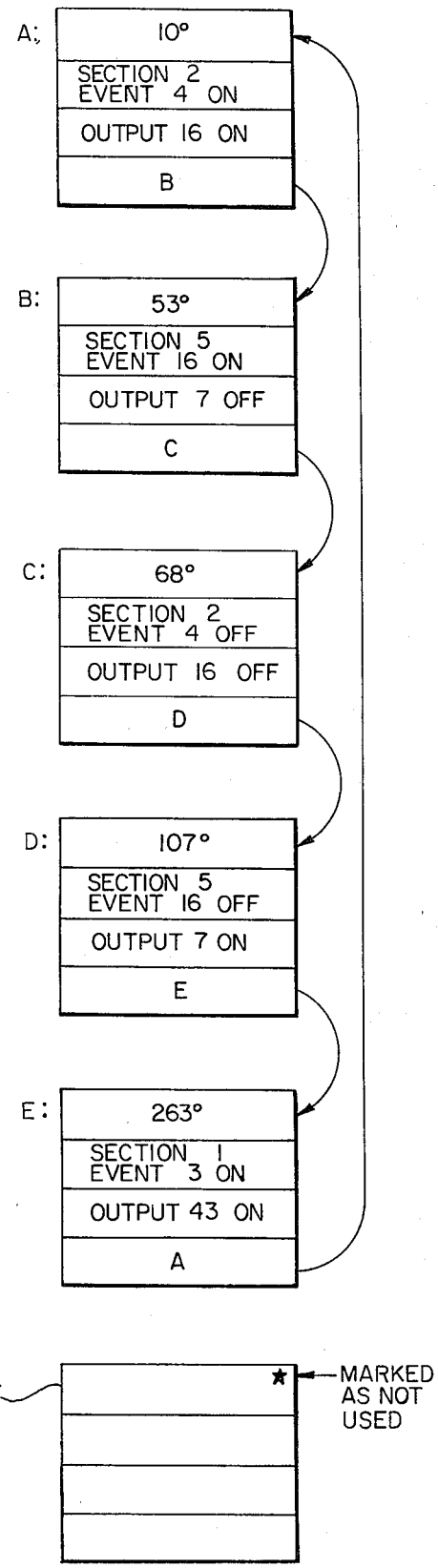
FIGS. 2 and 3 illustrate the threaded list logic of the system.

FIG. 2 shows by way of example a five element threaded, or linked list, wherein the first word of each element comprises an angle stored in memory; the second word comprises operator display information identifying the section, event, and state (on/off); the third word comprises the output or driver number and its state; and the fourth word comprises the memory address of the next element in the threaded list. An unused or blank element is also shown at F in FIG. 2, and illustrates the unused core storage capacity of the minicomputer.

From zero degrees in a cycle, in the example given in FIG. 2, the cycle counter is updated at a preset interval determined by the function generator 16 by the addition of the constant Q. This new value of the cycle counter is then compared with the first word (angle) stored in the next element in the threaded list (element A in FIG. 2).

When the contents of the cycle counter core store location is equal to or greater than the angle in the first word of element A, the processor performs the operation called for by the third word (output 16 on).

The fourth word is read by the processor, when such operation has been called for, to update a pointer, located in core store, so that further comparisons can be made with the first word of elements (angle).

This process is repeated for elements B, C, D, and E in the threaded list of FIG. 2. Element E continues the cycle back through element A etc. Element F is not used, that is this element is not in the threaded list.

Figure 3:
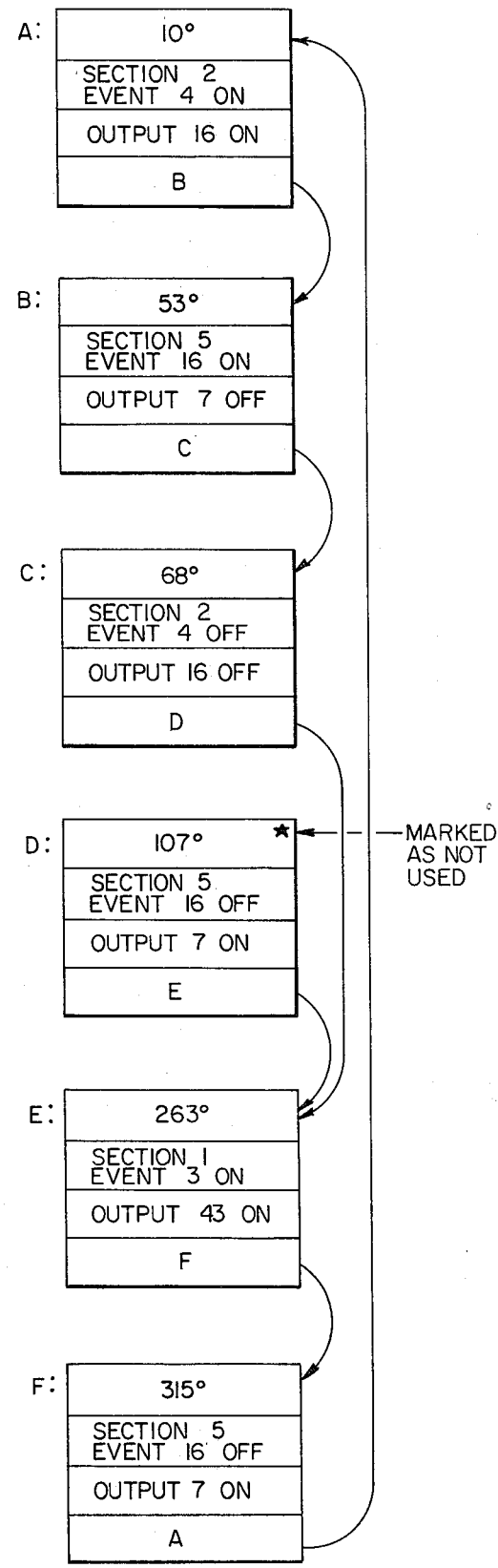

To change the angle at which a particular event takes place, the operator, via the operator's console, enters information describing the new angle with reference to a particular element if he merely wants to vary the sequence within a particular cycle that this event is to occur. This information causes the following changes in the threaded list:

A search for the element in the threaded list which pertains to the given event takes place (element D in our example). Upon finding the element, the CPU searches core store for an unused element (element F in FIG. 2). The CPU next copies all the information in words two and three from the old element (element D) into words two and three of the unused element (element F). The new angle is put in the first word of the unused element (in FIG. 3, 315°). Next, the CPU searches the threaded list for the proper insertion place for the new element. By changing the linkage of the threaded list, the new element is linked into the list, and the old element is excluded from the linkage and marked as unused.

The preferred minicomputer currently used for practicing the above described invention is the DEC PDP-11, not only because it is well suited to perform the above described operations when provided with the factored clock signal Q from the function generator 16, but also because DEC has recently introduced to the trade a compatible subsystem, the ICS-11 which provides a separately housed source of input/output modules, which can be located adjacent to the I. S. machine and feeder, and which still comprises a continuation of the UNIBUS architecture such that these modules contain circuitry for addressing, encoding, decoding, interrupt control and servicing, as well as data multiplexing and transfer. Thus, the proximity switch 14 data signal is encoded and fed to the UNIBUS through an input card in the module 26, and emergency stop manual switches on each section of the machine are also so received in the system. So too are the start/stop sequence control switches, and the gob delivery switch for each section as indicated at 28. The emergency, and normal shut down sequences are stored in memory for controlling these modes of operation in addition to the normal operating mode described above, and so too is the start-up mode, and the gob delivery mode, which introduces hot glass to each section after checking a machine set-up upon preparation for production of a particular size and shape of glassware. The subprogrammed, selectively addressable sequences are described in one or more of the U.S. patents listed above, and need not be described in detail herein. U.S. Pat. No. 3,905,793 discloses these subprograms, and is incorporated by reference herein.

We claim:

1. In a glassware forming machine having at least one section, which section includes a set of components controlled by an associated set of two-state (on/off) devices switchable between their on and off states in accordance with a cyclically repeated sequential program of switching events to cause said set of components to form a gob of glass into an article during each repeat of said program, and a feeder with a cyclically movable part which feeder provides a gob of glass to said one section during each cycle of said feeder part, the improvement comprising: means for producing a reference pulse once per cycle of said feeder part which reference pulse occurs at one point in the cyclic movement of said feeder part and is absent throughout the remainder of each cycle of said part so that the time elapsing between successive ones of said pulses is a measure of the time consumed by said part in undergoing one cycle of its movement, means receiving said reference pulses and providing therefrom a factor Q which represents the amount of cycle degrees said feeder part moves in a given increment of time (e.g., Q=degrees of feeder part movement each millisecond), a memory means storing a plurality of elements defining a sequential program of switching events such as aforesaid, each of said elements including a cycle angle word indicating the cycle angle at which an event defined by the element is to occur, means for adding said factor Q to a memory store upon the lapse of each of said given time increments to provide an updated store content, and means for comparing said cycle angle words of said stored elements to said updated store content to control the occurrence of said switching events.

2. The improvement defined in claim 1 further characterized by said means for producing a reference pulse once per cycle of said feeder part being a proximity switch.

3. A method for controlling a glassware forming machine having at least one section including a set of components controlled by an associated set of two-state (on/off) devices switchable between their on and off states in accordance with a cyclically repeated sequential program of switching events to cause said set of components to form a gob of glass into an article during each repeat of said program, and a feeder with a cyclically movable part which feeder provides a gob of glass to said one section during each cycle of said feeder part, said method comprising the steps of: producing a reference pulse once per cycle of said feeder part which reference pulse occurs at one point in the cyclic movement of said feeder part and is absent throughout the remainder of each cycle of said part so that the time elapsing between successive ones of said pulses is a measure of the time consumed by said part in undergoing one cycle of its movement, processing said reference pulses to provide a factor Q which represents the amount of cycle degrees said feeder part moves in a given increment of time (e.g., Q=degrees of feeder part movement each millisecond), storing a plurality of elements defining a sequential program of switching events such as aforesaid and each of which elements includes a cycle angle word indicating the cycle angle at which an event defined by the element is to occur, adding said factor Q to a memory store upon the lapse of each of said given time increments to provide an updated store content, and comparing said cycle angle words of said stored elements to said updated store content to control the occurrence of said switching events.

4. In a glassware forming machine having at least one section, which section includes a set of components controlled by an associated set of two-state (on/off) devices switchable between their on and off states in accordance with a cyclically repeated sequential program of switching events to cause said set of components to form a gob of glass into an article during each repeat of said program, and a feeder which provides a gob of glass to said one section during each cycle of operation of said section, the improvement comprising: means for producing repetitive reference pulses at a rate of one pulse per desired cycle of said switching events so that the time elapsing between successive ones of said pulses is a measure of the time to be consumed by said components in undergoing one cycle of section operation, means receiving said reference pulses and providing therefrom a factor Q which represents the amount of section cycle degrees corresponding to a given increment of time (e.g., Q=cycle degrees each millisecond), a memory means storing a plurality of elements defining a sequential program of switching events such as aforesaid, each of said elements including a cycle angle word indicating the cycle angle at which an event defined by the element is to occur, means for adding said factor Q to a memory store upon the lapse of each of said given time increments to provide an updated store content, and means for comparing said cycle angle words of said stored elements to said updated store content to control the occurrence of said switching events.

5. A method for controlling a glassware forming machine having at least one section including a set of components controlled by an associated set of two-state (on/off) devices switchable between their on and off states in accordance with a cyclically repeated sequential program in switching events to cause said set of components to form a gob of glass into an article during each repeat of said program, and a feeder which provides a gob of glass to said one section during each cycle of operation of said section, said method comprising the steps of: producing repetitive reference pulses at a rate of one pulse per desired cycle of said switching events so that the time elapsing between successive ones of said pulses is a measure of the time to be consumed by said components in undergoing one cycle of section operation, processing said reference pulses to provide a factor Q which represents the amount of section cycle degrees corresponding to a given increment of time (e.g., Q=cycle degrees each millisecond), storing a plurality of elements defining a sequential program of switching events such as aforesaid and each of which elements includes a cycle angle word indicating the cycle angle at which an event defined by the element is to occur, adding said factor Q to a memory store upon the lapse of each of said given time increments to provide an updated store content, and comparing said cycle angle words of said stored elements to said updated store content to control the occurrence of said switching events.

* * * * *